(12) United States Patent
Keith et al.

(10) Patent No.: US 10,270,204 B2
(45) Date of Patent: Apr. 23, 2019

(54) PATCH CORDS FOR REDUCED-PAIR ETHERNET APPLICATIONS HAVING STRAIN RELIEF UNITS THAT RESIST ROTATIONAL LOADS AND RELATED STRAIN RELIEF UNITS AND CONNECTORS

(71) Applicant: CommScope, Inc. of North Carolina, Hickory, NC (US)

(72) Inventors: Scott M. Keith, Plano, TX (US); Yi Teh Shih, Richardson, TX (US)

(73) Assignee: COMMSCOPE, INC. OF NORTH CAROLINA, Hickory, NC (US)

( * ) Notice: Subject to any disclaimer, the term of this patent is extended or adjusted under 35 U.S.C. 154(b) by 0 days.

(21) Appl. No.: 15/786,822

(22) Filed: Oct. 18, 2017

(65) Prior Publication Data

US 2018/0102604 A1 Apr. 12, 2018

Related U.S. Application Data

(63) Continuation of application No. 15/163,371, filed on May 24, 2016, now Pat. No. 9,831,598, which is a
(Continued)

(51) Int. Cl.
*H01R 13/58* (2006.01)
*H02G 15/064* (2006.01)
(Continued)

(52) U.S. Cl.
CPC ......... *H01R 13/5825* (2013.01); *H01B 11/02* (2013.01); *H01B 13/06* (2013.01);
(Continued)

(58) Field of Classification Search
CPC ............ H01R 13/5825; H01R 13/5816; H01R 13/565; H01R 24/28; H01R 24/64;
(Continued)

(56) References Cited

U.S. PATENT DOCUMENTS 2,710,386 A * 6/1955 Hall ................... H01R 33/9655
174/14 R
3,020,516 A * 2/1962 Despard ............... H01R 4/2483
439/416
(Continued)

FOREIGN PATENT DOCUMENTS

CN 1647326 A 7/2005
CN 101299502 11/2008
(Continued)

OTHER PUBLICATIONS

Office Action in Chinese Application No. 2014800534793, dated Jun. 2, 2017, 16 pages.
(Continued)

*Primary Examiner* — Abdullah A Riyami
*Assistant Examiner* — Vladimir Imas
(74) *Attorney, Agent, or Firm* — Merchant & Gould P.C.

(57) ABSTRACT

Reduced-pair Ethernet patch cords include a twisted pair cable that has a pair of insulated conductors that are contained within a cable jacket. A connector is mounted on a first end of the cable. The connector includes a connector housing and a strain relief unit that is mounted on the cable at the interface between the cable and the connector housing. The strain relief unit includes a plurality of internal protrusions that contact the cable jacket.

18 Claims, 6 Drawing Sheets

Related U.S. Application Data continuation of application No. 14/340,635, filed on Jul. 25, 2014, now Pat. No. 9,356,439.

(60) Provisional application No. 61/882,715, filed on Sep. 26, 2013.

(51) Int. Cl.

| | | |
|---|---|---|
| *H01B 11/02* | (2006.01) | |
| *H01B 13/06* | (2006.01) | |
| *H01R 43/28* | (2006.01) | |
| *H01R 24/64* | (2011.01) | |
| *H01R 24/28* | (2011.01) | |
| *H01R 13/56* | (2006.01) | |
| *H01R 107/00* | (2006.01) | |

(52) U.S. Cl.
CPC ......... *H01R 13/5816* (2013.01); *H01R 24/28* (2013.01); *H01R 24/64* (2013.01); *H01R 43/28* (2013.01); *H02G 15/064* (2013.01); *H01R 13/565* (2013.01); *H01R 2107/00* (2013.01); *H01R 2201/26* (2013.01); *Y10T 29/49183* (2015.01)

(58) Field of Classification Search
CPC .......................... H01R 43/28; H01R 2107/00; H01R 2201/26; H01B 13/06; H02G 15/064; Y10T 29/49183
USPC .................................................. 439/447, 449
See application file for complete search history.

(56) References Cited

U.S. PATENT DOCUMENTS

| | | | | |
|---|---|---|---|---|
| 3,448,430 A * | 6/1969 | Kelly | ....................... | H01R 9/05 174/75 C |
| 3,518,600 A * | 6/1970 | Urani | ................... | H01H 85/201 174/138 F |
| 3,846,738 A * | 11/1974 | Nepovim | ................... | H01R 9/05 439/584 |
| 5,362,251 A * | 11/1994 | Bielak | ..................... | H01R 9/053 439/394 |
| 5,456,611 A * | 10/1995 | Henry | ................ | H01R 13/6395 439/180 |
| 6,056,586 A | 5/2000 | Lin | | |
| 6,089,912 A * | 7/2000 | Tallis | ........................ | H01R 9/05 439/583 |
| 6,109,954 A | 8/2000 | Lin | | |
| 6,431,904 B1 * | 8/2002 | Berelsman | ......... | H01R 13/5845 439/344 |
| 6,568,953 B1 * | 5/2003 | AbuGhazaleh | .... | H01R 13/6463 439/418 |
| 7,086,897 B2 * | 8/2006 | Montena | .............. | H01R 9/0524 439/460 |
| 7,413,466 B2 * | 8/2008 | Clark | ..................... | H01R 13/03 439/461 |
| 7,712,214 B2 * | 5/2010 | Clark | ..................... | H01R 13/03 174/27 |
| 7,749,021 B2 * | 7/2010 | Brodeur | ................. | H01R 13/59 174/359 |
| 7,793,993 B2 * | 9/2010 | Kees | ................... | F16L 37/0915 285/322 |
| 7,828,595 B2 * | 11/2010 | Mathews | ............. | H01R 9/0524 439/578 |
| 7,938,674 B2 | 5/2011 | Lindkamp et al. | | |
| 8,075,338 B1 * | 12/2011 | Montena | ................ | H01R 24/40 439/578 |
| 8,109,789 B2 * | 2/2012 | Tyler | ................... | H01R 13/5205 439/587 |
| 8,137,126 B2 * | 3/2012 | Clark | ..................... | H01R 13/03 439/461 |
| 8,167,646 B1 * | 5/2012 | Mathews | ................. | H01R 9/05 439/578 |
| 8,574,000 B1 * | 11/2013 | Smith | .................. | H01R 13/562 439/447 |
| 8,684,763 B2 * | 4/2014 | Mattson | ................. | H01R 13/58 439/447 |
| 8,804,538 B1 * | 8/2014 | Higgins | .............. | H04L 43/0811 315/294 |
| 8,845,359 B2 * | 9/2014 | Taylor | .................. | H01R 13/501 439/447 |
| 8,882,514 B2 * | 11/2014 | Enge | ..................... | H01R 9/032 439/676 |
| 8,979,553 B2 * | 3/2015 | Lloyd | .................... | H01R 12/53 439/76.1 |
| 9,011,174 B2 * | 4/2015 | Kashiyama | .......... | H01R 13/567 439/447 |
| 9,356,439 B2 * | 5/2016 | Keith | ................. | H01R 13/5816 |
| 9,831,598 B2 | 11/2017 | Keith et al. | | |
| 2003/0199192 A1 | 10/2003 | Caveney et al. | | |
| 2006/0025006 A1 * | 2/2006 | Powell | ............... | H01R 13/5812 439/449 |
| 2012/0068830 A1 * | 3/2012 | Caveney | ................. | H04Q 1/138 340/10.2 |
| 2012/0329320 A1 | 12/2012 | Taylor et al. | | |
| 2013/0157500 A1 | 6/2013 | Mattson et al. | | |
| 2013/0224989 A1 | 8/2013 | Giefers | | |
| 2015/0083455 A1 | 3/2015 | Kieth et al. | | |
| 2016/0164223 A1 | 6/2016 | Zebhauser et al. | | |

FOREIGN PATENT DOCUMENTS

| | | |
|---|---|---|
| CN | 102082354 A | 6/2011 |
| CN | 102246358 A | 11/2011 |
| CN | 103155298 A | 6/2013 |
| DE | 202013006297 U1 | 9/2013 |
| EP | 1988611 A1 | 11/2008 |

OTHER PUBLICATIONS

International Search Report and Written Opinon for PCT/US2014/048528, dated Oct. 9, 2014, 9 pages.

Office Action in European Application No. 14758001.3, dated Mar. 28, 2018, 8 pages.

Office Action in Chinese Application No. 2014800534793, dated Jan. 19, 2018, 17 pages.

Office Action in Chinese Application No. 2014800534793, dated Jun. 21, 2018, 25 pages [English translation].

Office Action in Japanese Application No. 2016-545730, dated Jul. 31, 2018, 3 pages [English translation].

* cited by examiner

PATCH CORDS FOR REDUCED-PAIR ETHERNET APPLICATIONS HAVING STRAIN RELIEF UNITS THAT RESIST ROTATIONAL LOADS AND RELATED STRAIN RELIEF UNITS AND CONNECTORS

CROSS-REFERENCE TO RELATED APPLICATION

This application is a continuation of application Ser. No. 15/163,371, filed May 24, 2016, now U.S. Pat. No. 9,831,598, which is a is a continuation of application Ser. No. 14/340,635, filed Jul. 25, 2014, now U.S. Pat. No. 9,356,439, which application claims the benefit of U.S. Provisional Patent Application Ser. No. 61/882,715, filed Sep. 26, 2013, which applications are incorporated herein by reference.

FIELD OF THE INVENTION

The present invention relates generally to communications systems and, more particularly, to patch cords for reduced-pair Ethernet applications.

BACKGROUND

The use of electronic devices that transmit and/or receive large amounts of data over a communications network such as cameras, televisions and computers continues to proliferate. Data may be transferred to and from these devices by hardwired or wireless connections, or a combination thereof. Devices that are connected to a communications network via a hardwired connection often use so-called Ethernet cables and connectors as these cables and connectors can support high data rate communications with a high level of reliability. Various industry standards such as, for example, the ANSI/TIA-568-C.2 standard, approved Aug. 11, 2009 by the Telecommunications Industry Association (referred to herein as "the Category 6a standard"), set forth interface and performance specifications for Ethernet cables, connectors and channels. Ethernet connectors and cables are routinely used in office buildings, homes, schools, data centers and the like to interconnect computers, fax machines, printers and other electronic devices in hardwired, high-speed communications networks.

As is well known in the art, Ethernet cables and connectors typically include four pairs of conductors that may be used to transmit four differential signals. Differential signaling techniques, where each signal is transmitted over a pair of conductors, are used because differential signals may be impacted less by external noise sources and internal noises sources such as crosstalk as compared to signals that are transmitted over a single-conductor. In Ethernet cables, the insulated conductors of each differential pair are tightly twisted about each other to form four twisted pairs of conductors, and these four twisted pairs may be further twisted about each other in a so-called "core twist." A separator may be provided that is used to separate (and hence reduce coupling between) at least one of the twisted pairs from at least one other of the twisted pairs. The four twisted pairs and any separator may be enclosed in a protective jacket.

While hardwired Ethernet cables and connectors can support high data rates with excellent reliability in home, office and data center applications, Ethernet cables and connectors may be less well-suited for automotive, industrial and other applications that may involve harsher environments. Accordingly, Ethernet cables and connectors have typically not been used in these environments.

One relatively harsh environment where hardwired communications networks may be used is in automobiles and other types of vehicles, including planes, boats, etc. Communications connectors and cables that are used in automobiles are routinely subjected to high levels of vibration, wide temperature swings, and mechanical shocks, stresses and strains. Typically, single-ended communications channels that use non-Ethernet connectors and cabling are used in such environments, and the cables and connectors may be rather large and heavy. For example, pin connectors and socket connectors are sometimes used in automotive applications to detachably connect two communications cables and/or to detachably connect a communications cable to a printed circuit board or electronic device, as pin and socket connections can typically maintain good mechanical and electrical connections even when used for long periods of time in harsh environments.

SUMMARY

Pursuant to embodiments of the present invention, reduced-pair Ethernet patch cords are provided that include a twisted pair cable that has a pair of insulated conductors that are contained within a cable jacket. A connector is mounted on a first end of the cable. The connector includes a connector housing and a strain relief unit that is mounted on the cable at the interface between the cable and the connector housing. The strain relief unit has a plurality of internal protrusions that contact the cable jacket.

In some embodiments, the internal protrusions may be generally longitudinally aligned with a longitudinal axis of the connector. The strain relief unit may include a cable-gripping member that engages the cable and a compression member that is configured to apply a radially compressive force on the cable-gripping member. The compression member may be fixed relative to the connector housing. The protrusions may be, for example, teeth that are provided on an interior surface of the cable-gripping member. The protrusions may create respective depressions in the cable jacket. A stop may be provided in the connector housing that fixes the longitudinal position of the cable-gripping member within the connector housing. The twisted pair cable may include only a single pair of insulated conductors. The internal protrusions may contact the cable jacket to resist against rotational forces applied to the cable.

Pursuant to further embodiments of the present invention, patch cords are provided that include a cable that has a cable jacket that has at least one twisted pair of insulated conductors disposed therein, a connector that has a housing mounted on a first end of the cable. The connector includes a strain relief unit positioned at least partly within the housing. The strain relief unit includes a cable-gripping member that is mounted on the cable, the cable-gripping member including at least one uneven surface that is positioned to contact the cable jacket, and a compression member that is configured to apply a compressive force against the cable-gripping member when the compression member and cable-gripping member are installed within the connector.

In some embodiments, the compression member may be configured to apply a radial force to the cable-gripping member. The uneven surface may be configured to create a plurality of depressions in the cable jacket. The compression member may further include a cap that is mounted on a rear end of the housing. The cable-gripping member may include a plurality of cantilevered arms, and uneven surfaces may be provided on each of the cantilevered arms. In some embodiments, the interior surface of each of the cantilevered arms comprises an arcuate surface, and the uneven surface on each of the plurality of cantilevered arms comprises a plurality of teeth projecting from the interior surface thereof. The compression member may include a plurality of wedge shaped arms that are configured to apply a radially compressive force on respective ones of the cantilevered arms when the compression member and the cable-gripping member are installed within the housing. The patch cord may include at least one and no more than three twisted pairs of conductors.

Pursuant to still further embodiments of the present invention, methods of connectorizing a cable are provided in which first and second conductors of a twisted pair of conductors of a communications cable are terminated into respective first and second contacts. End portions of the terminated first and second conductors and the first and second contacts are inserted into a connector housing. A strain relief unit is slid along the communications cable and into a rear opening of the connector housing. A cable-gripping member of the strain relief unit may then be compressed onto the communications cable. The cable-gripping member has at least one protrusion that is positioned to engage a jacket of the communications cable when the strain relief unit is installed in the connector housing so as to resist angular rotation of the cable.

In some embodiments, the cable-gripping member may be at a fixed longitudinal position within the connector when it compresses onto the communications cable. The cable-gripping member may be compressed onto the communications cable by sliding a compression member of the strain relief unit onto the cable-gripping member.

DETAILED DESCRIPTION

Figure 1:
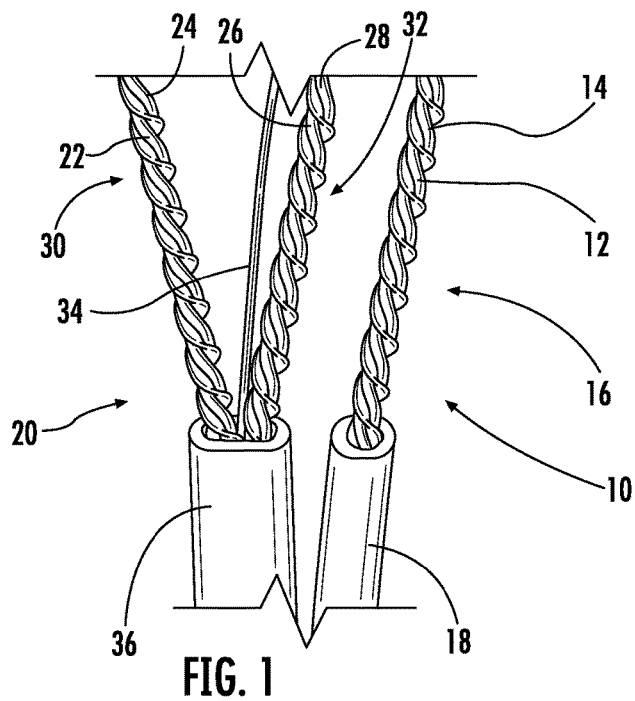
FIG. 1 is a partially cut-away perspective view of a first reduced-pair Ethernet cable that includes a single twisted pair of insulated conductors and of a second reduced-pair Ethernet cable that includes two twisted pairs of insulated conductors.

Ethernet communications channels that connect a first electronic device to a second electronic device often includes more than one cable segment. Inline connectors such as, for example, communications jacks, are used to connect a first cable segment to a second cable segment to form the end-to-end communications channel between the two electronic devices. In many cases, one or both ends of each cable segment will be terminated with a connector such as a communications plug that may be releasably mated with the inline connector. Herein, a cable segment that includes a communications connector such as, for example, a plug on at least one end thereof is referred to as a "patch cord." Most typically, a patch cord will have plug connectors on one or both ends thereof, but it will be appreciated that other types of connectors (e.g., jack connectors or non-plug-jack connectors) may be used.

An Ethernet patch cord plug typically has eight output terminals in the form of plug blades that are electrically connected to the respective conductors of the cable segment. This plug may be inserted into a mating jack so that the plug blades electrically connect to respective input terminals of the jack, which are often implemented as eight jackwire contacts. The jack may be mounted on an electronic device or may be electrically connected to another communications cable segment that is typically terminated into wire connection terminals provided in the back portion of the jack. The plug and jack can be readily connected and disconnected from each other in order to facilitate future connectivity changes.

A potential problem with conventional Ethernet patch cords is that forces may be applied to the cable segment of the patch cord that may cause the cable (or some of the conductors therein) to pull away from the plug blades or to even pull out of the plug. These forces may arise, for example, because individuals accidentally pull on the cable or because excessive forces are applied to the cable when the plug is removed from a mating jack. Such forces can degrade the performance of the patch cord, or render it unusable, as the connections between the conductors of the cable segment and the plug blades (or other terminals) may be loosened or disconnected as a result of the pulling forces on the cable. Axial pulling forces are of particular concern (i.e., a generally "straight pull" along the longitudinal direction of the plug), but "side pulls" may also cause problems where the pulling force is at an angle to the longitudinal axis of the plug. In order to reduce the impact of such pulling forces, prior art patch cords include strain relief mechanisms. For example, one prior art strain relief mechanism uses an anchoring member that is disposed in the plug housing, and another part of the housing pressures the cable against the anchoring member in order to securely lock the cable in place. Another known type of strain relief mechanism is a compression ring that fits around the cable that is forcibly inserted within a tapered portion of a bore through the plug housing so that the ring gradually compresses around and tightly grips the cable. The compression ring may include one or more latching projections that mate with latch openings in the plug housing at a point where the ring is near maximum compression to lock the compression ring in place. Thus, the compression ring, gripping the cable, is held within the bore of the plug, and resists pulling stresses that may be applied to the cable.

So-called "reduced-pair Ethernet" cables and connectors are now under development that include less than four differential pairs of conductors. Of particular interest are single-pair cables that include a single twisted pair of insulated conductors in a jacket (with no separator since only a single-pair is used) and single-pair patch cords that are connectorized versions of such cables. Single-pair patch cords may be joined to a mating single-pair connector or may be joined to a multi-pair connector that is designed to connect a plurality of single-pair patch cords to corresponding cables or patch cords. Two-pair and three-pair reduced-pair Ethernet cables, patch cords and connectors are also under consideration.

In reduced-pair Ethernet applications, the patch cords may be implemented, for example, using plug connectors, jack connectors or a plug connector on one end and a jack connector on the other end. In the discussion that follows, the patch cords will be described as having plug connectors, and the patch cords are mated with inline jack connectors (e.g., a connector that has two jacks arranged back-to-back) that may be used to electrically connect a first patch cord to a second patch cord. However, it will be appreciated that in other embodiments of the present invention patch cords that include jack connectors may be used instead, and it will also be appreciated that jacks other than inline jacks may be used such as, for example, jacks that electrically connect a patch cord to a printed circuit board.

In order to reduce the effects of crosstalk, the conductors of the twisted pairs of an Ethernet patch cord cable may be kept twisted right up to the point where the conductors are terminated into mating structures in the plug (e.g., insulation piercing contacts that may be included at the back of each plug blade or on a printed circuit board or metal-plated apertures on a printed circuit board). The same is true with respect to reduced-pair Ethernet patch cords, in order to reduce crosstalk between the twisted pairs within a single cable (in applications having at least two pairs per cable) and/or to reduce "alien" crosstalk that may arise between adjacent reduced-pair Ethernet cables and connectors. Additionally, in both standard and reduced-pair Ethernet applications, the patch cords and connectors may be designed to cancel out any crosstalk that is expected to arise in the connectors in order to keep crosstalk at a minimum. As a result, any variation from a design goal regarding the amount (if any) that a twisted pair of a patch cord is untwisted proximate its termination point within a connector can result in increased crosstalk (e.g., with another twisted pair in the cable or with a twisted pair in an adjacent cable) that can degrade the data transmission performance of the patch cord.

Unfortunately, if a single-pair Ethernet patch cord is twisted (i.e., the cable is rotated about its longitudinal axis with respect to the plug connector), the twisted pair contained within the cable may be either partially untwisted or over-twisted, depending upon the direction of rotation. In particular, when a rotational force (torque) is applied to the twisted pair that is opposite the direction of the original twist, the twist for a portion of the twisted pair may tend to loosen. This may degrade the crosstalk and/or return loss characteristics of the patch cord. Similarly, when a rotational force is applied to the twisted pair that is in the same direction as the original twist, a portion of the twisted pair may become over-twisted. This may also degrade the crosstalk and/or return loss characteristics of the patch cord. It is also possible for twisted pair cable to be compressed axially inside the connector during assembly of the connector. This compression may occur, for example, when the strain relief member is inserted into the rear of the connector and is pressed into the connector body to latch in place. This action may compress the cable inside the connector housing between the stain relief member and fixed terminals and can cause the conductors of the twisted pair to be forced apart forming "open loops" in the communications cable. These open loops may degrade the crosstalk and/or return loss characteristics of the patch cord.

Pursuant to embodiments of the present invention, patch cords are provided that have connectors with strain relief units that may resist rotation of a cable of the patch cord relative to the connectors thereof in response to a rotational force. The strain relief units may also protect against axial loads or side loads that are applied to the cable thereof. The strain relief units used in the patch cords according to embodiments of the present invention may facilitate providing patch cords with better and more consistent data transmission performance.

In some embodiments, the patch cords may comprise single-pair patch cords that include a cable having a single twisted pair of insulated conductors that is surrounded by a protective jacket. In other embodiments, the patch cord cables may include more than a single-pair of twisted conductors, such as two pairs of twisted conductors. The patch cords may also be implemented with cables in which more than two insulated conductors are twisted together, such as in patch cords implemented with so-called "twisted-quad" shielded cables that have four insulated conductors that are twisted together.

In some embodiments, the strain relief unit may comprise a two-piece unit that is mounted in a rear portion of the connector housing. Such strain relief units may include a cable-gripping member that is configured to engage an exterior surface of the cable of the patch cord and a compression member which is configured to compress the cable-gripping member against the cable. In some embodiments, the cable gripping member may comprise a collar that is mounted on the cable and the compression member may comprise a cap that both closes off the back portion of the connector housing and imparts a compressive force on the collar so that the collar securely locks the cable within the housing and resists axial, side-pull and rotational forces or loads. The cable-gripping member may include a plurality of teeth or other projections on an interior surface thereof that "bite" into the exterior surface of the cable and hence resist rotation of the cable of the patch cord relative to the connector. At least some of these teeth or other projections may be generally aligned along a longitudinal directional of the connector to better resist against twisting of the cable relative to the connector.

In some embodiments, the strain relief unit may only include a cable-gripping member, and features on the connector housing may be used to compress the cable-gripping member against the cable.

The patch cords, connectors and strain relief units according to embodiments of the present invention may be used in various applications such as automotive, industrial and other applications which may comprise harsher environments that are not well-suited to traditional Ethernet cables and connectors. In some embodiments, the patch cords may be terminated with pin connectors or socket connectors. The twisted pair(s) in the cable of the patch cord may maintain their twist right up to the point at which the conductors of the cable terminate into the appropriate termination in the connector (e.g., into a respective sockets of the connector or into a printed circuit board of the connector).

Certain embodiments of the present invention will now be described with reference to the drawings, in which example implementations of the present invention are depicted.

Referring to FIG. 1, two reduced-pair Ethernet cables are shown, namely a first cable 10 and a second cable 20. The first cable 10 includes first and second conductors 12, 14 that are twisted together to form a single twisted pair 16. The conductors 12, 14 are enclosed by a protective jacket 18. The second cable 20 includes first through fourth conductors 22, 24, 26, 28. Conductors 22 and 24 are twisted together to form a first twisted pair 30, and conductors 26 and 28 are twisted together to form a second twisted pair 32. The twisted pairs 30 and 32 are separated by a separator 34, and are encased in a protective jacket 36.

Figure 2:
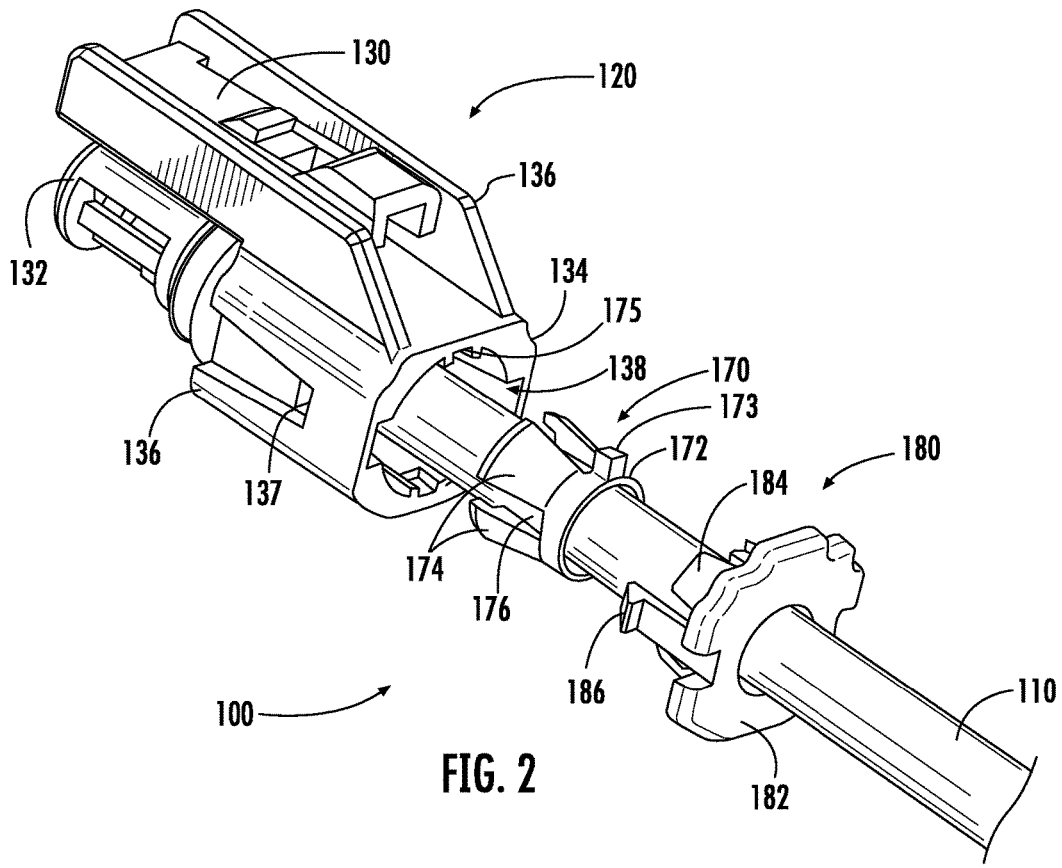
FIG. 2 is a exploded perspective view of an end portion of a patch cord according to embodiments of the present invention.
Figure 3:
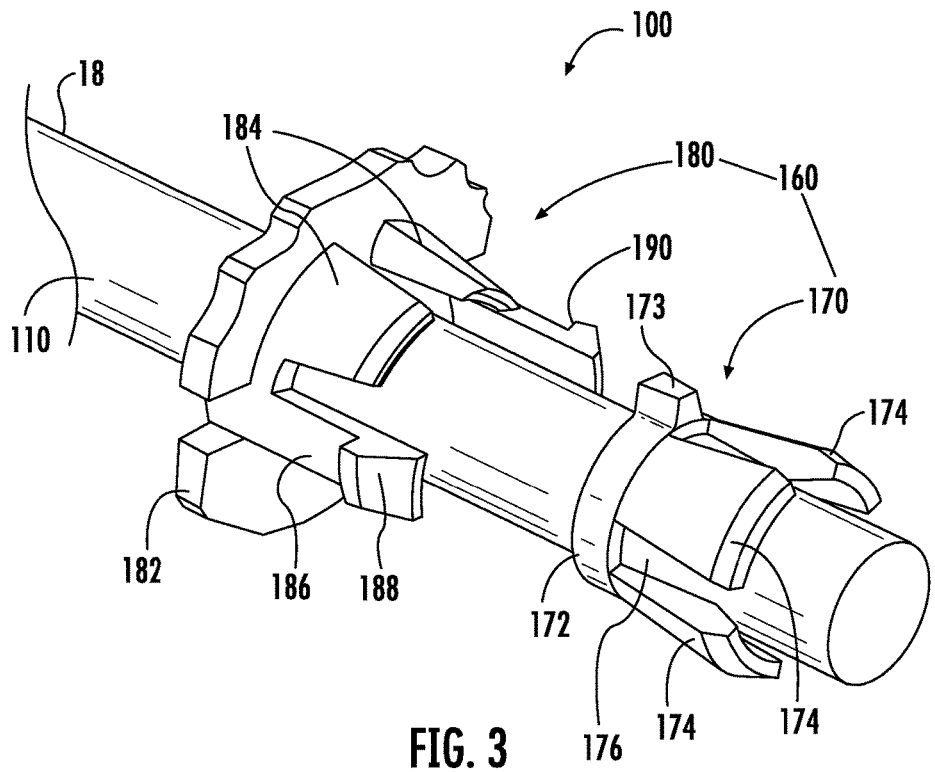
FIG. 3 is an enlarged view of the cable of the patch cord of FIG. 2 with a strain relief unit of the patch cord mounted thereon.
Figure 4:
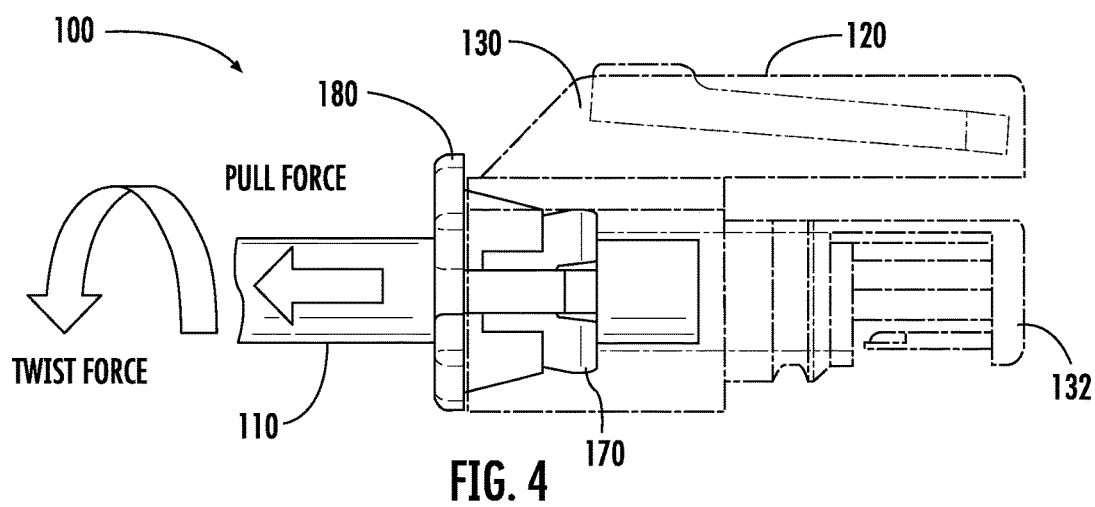
FIG. 4 is a partially cut-away side view of the connector of the patch cord of FIG. 2 with the contact carrier of the connector omitted.
Figure 5:
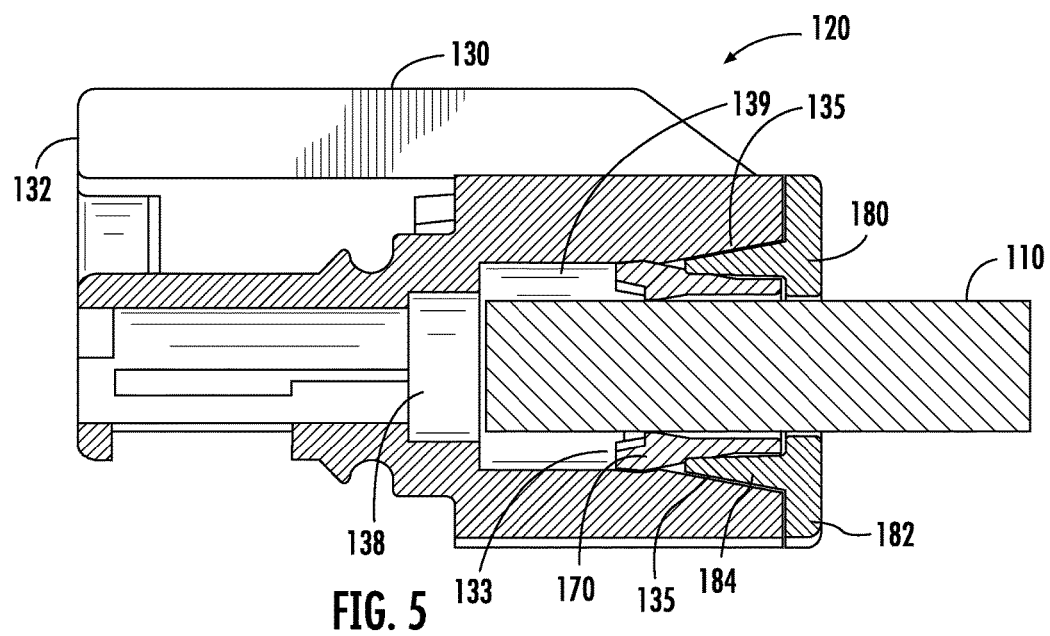
FIG. 5 is a cross-sectional view of the connector housing and strain relief unit of the patch cord of FIG. 2.
Figure 6:
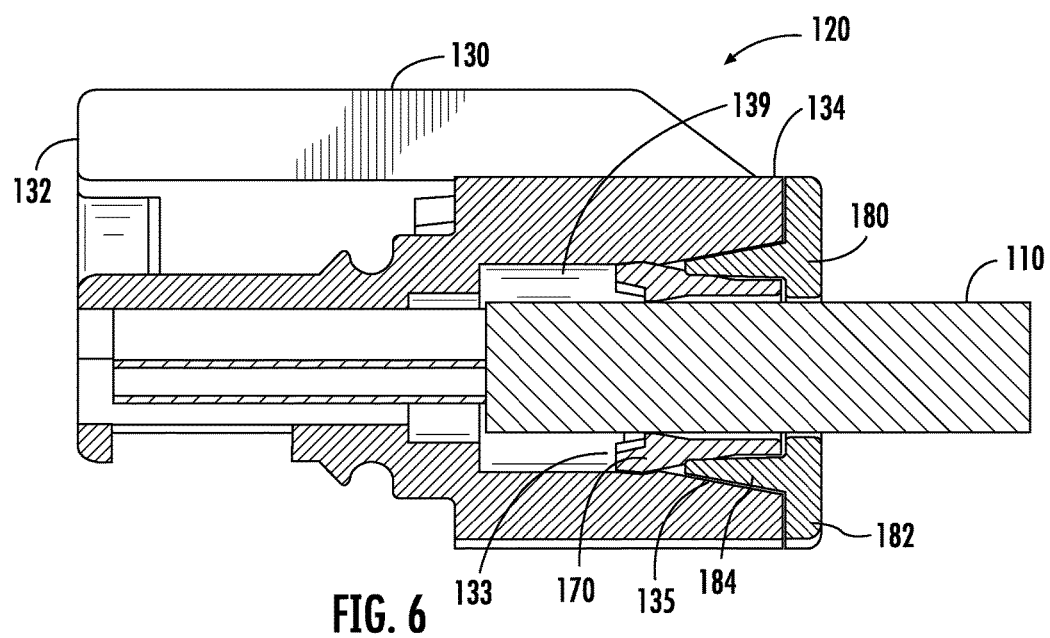
FIG. 6 is a cross-sectional view of the connector of the patch cord of FIG. 2 that illustrates the contact carrier and one of the contacts of the connector.
Figure 7:
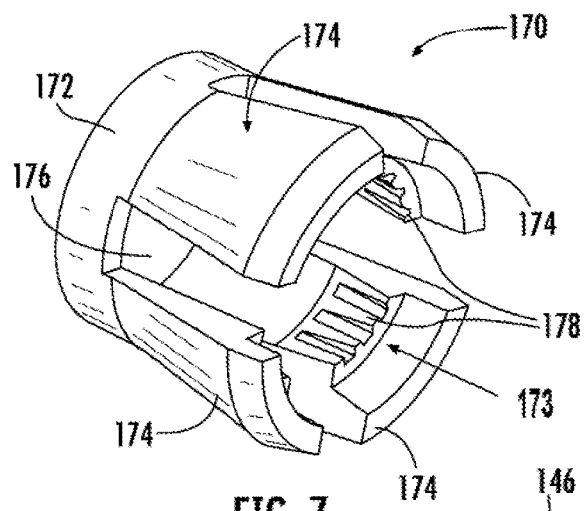
FIG. 7 is an enlarged perspective view of a cable-gripping member of the strain relief unit of the connector on the patch cord of FIG. 2.

FIGS. 2-8 illustrate a patch cord 100 according to embodiments of the present invention that includes a cable 110 and a connector 120 on at least one end thereof. FIG. 2 is an exploded perspective view of an end portion of the patch cord 100. FIG. 3 is an enlarged view of the cable 110 with a strain relief unit 160 of the connector 120 mounted thereon. FIG. 4 is a partially cut-away side view of the connector 120 with the contact carrier thereof omitted. FIG. 5 is a cross-sectional view of the connector housing and strain relief unit of the patch cord 100. FIG. 6 is a cross-sectional view of the connector 120 that illustrates the contact carrier and one of the contacts thereof. FIG. 7 is an enlarged perspective view of a cable-gripping member of the strain relief unit of the connector 120. FIGS. 8A-8D illustrate the contacts of the connector 120 and show how they may mate with the contacts of a mating inline connector to electrically connect a first patch cord 100 to a second patch cord 100.

Referring to FIG. 2, the patch cord 100 comprises a cable 110 and a connector 120. The cable 110 may be identical to the cable 10 discussed above with reference to FIG. 1, and may include first and second conductors 12, 14 that are twisted together to form a twisted pair 16, and a protective jacket 18. In FIGS. 2-6, only the cable jacket 18 of cable 110 is illustrated to simplify the drawings.

The connector 120 includes a connector housing 130, a contact carrier 140 (see FIG. 6) that includes a pair of contacts 142, 144 (FIGS. 6 and 8A-8D) and a strain relief unit 160. The housing 130 has a front end 132, a rear end 134 and side surfaces 136. A bore 138 extends longitudinally through the housing 130. A rear portion of the bore 138 comprises a cable-receiving cavity 139 (see FIGS. 5-6). Windows 137 are provided in the respective side surfaces 136. The cable 110 is received through an opening in the rear end 134 of housing 130 and extends into the cable-receiving cavity 139 of the bore 138. As shown in FIG. 6, the contact carrier 140 resides in a front portion of the bore 138. The jacket 18 of cable 110 may extend into the bore 138 up to the rear end of the contact carrier 140. The insulated conductors 12, 14 of cable 110 (see FIG. 1) may extend farther forwardly than the jacket 18 in order to make mechanical and electrical connections to their respective contacts 142, 144. The insulation may be removed from the end of insulated conductors 12, 14, and the exposed conductors thereof may be inserted within (or otherwise mated to) the respective contacts 142, 144. The housing 130 may comprise a dielectric housing, and may include various features that allow the connector 120 to be releasably joined to a mating connector (not shown). In the embodiment of FIGS. 2-8, the connector 120 comprises a plug that is configured to be received within the plug aperture of a mating jack.

Referring to FIGS. 2-3 and 7, the strain relief unit 160 comprises a two-piece unit that includes a cable-gripping member 170 and a compression member 180. Both pieces 170, 180 may be made of, for example, a flexible material such as a plastic material (e.g., polycarbonate). In some embodiments, the cable-gripping member 170 may comprise a generally cylindrical member that has a generally circular bore extending therethrough that may be dimensioned to receive the cable 110. In some embodiments, the cable-gripping member 170 may extend a full 360 degrees around the circumference of the cable 110, while in other embodiments, the cable-gripping member 170 may extend less than 360 degrees around the circumference of the cable 110 as would be the case, for example, with a generally C-shaped cable-gripping member 170 (see FIG. 9). The cable-gripping member 170 may be designed to engage the jacket 18 of cable 110 and to resist rotation of the cable 110 with respect to the connector housing 130 of patch cord 100.

In the exemplary embodiment depicted in FIGS. 2-7, the cable-gripping member 170 has an annular base 172 and four generally wedge-shaped cantilevered arms 174 that extend forwardly from the annular base 172. Gaps 176 are provided between adjacent ones of the cantilevered arms 174. In the depicted embodiment, each cantilevered arm 174 has a generally arcuate interior surface that is designed to generally mimic the contour of the exterior surface of the jacket 18 of cable 110. Moreover, a plurality of protrusions 178 (see FIG. 7) extend from the interior surface of each cantilevered arm 174 in the form of longitudinally extending teeth 178. Each cantilevered arm 174 tapers from its distal end toward the base 172 so that a circle defined by the distal ends of the four cantilevered arms 174 may have a diameter that is greater than the diameter of the annular base 172. Because the arms 174 are both cantilevered and formed of a flexible material, they may be pressed inwardly if subjected to a radially compressive force. In the depicted embodiment, the cable-gripping member 170 comprises a collar that may be inserted over an end portion of the cable 110, as is best shown in FIG. 3. Thus, member 170 is referred to herein as both a "collar" and as a "cable-gripping member." As discussed below, in other embodiments, the collar may not act as a cable-gripping member. As shown in FIGS. 4-6, the collar 170 ultimately is received within the cable-receiving cavity 139 when the patch cord 100 is fully assembled.

As shown in FIGS. 2-3, the compression member 180 has a base 182 that has a flat rear surface. Four compression wedges 184 and two cantilevered latches 186 extend forwardly from the base 182. As shown in the figures, the compression member 180 is mounted on the cable 110 rearwardly of the cable-gripping member 170. The forwardly-extending compression wedges 184 are radially disposed about the base 182, and each compression wedge 184 may be longitudinally aligned with a respective one of the cantilevered arms 174 of the cable-gripping member 170. The compression wedges 184 may define a cylinder having a diameter that is greater than the diameter of the base 172 of the cable-gripping member 170. Each latch 186 has a tab 188 at its distal end that slopes outwardly from the distal end of the latch 176. The rear surface of each tab 188 forms a stop 190. The latches 186 are spaced apart in the transverse dimension a distance that is slightly greater than the width of the rear opening into the housing 130. In the depicted embodiment, the compression member 180 comprises a rear cap for the housing 130 that allows the cable 110 access into the bore 138 of the housing 130 while covering the remainder of the opening into the rear end 134 of the housing 130. Thus, member 180 is referred to herein as both a "cap" and as a "compression member." As discussed below, in other embodiments, the cap may not act as a compression member.

The strain relief unit 160 may operate as follows. The cap 180 and the collar 170 may be slid over the end of the cable 110 as is shown in FIG. 2, with the bases 172, 182 being slid onto the cable 110 first so that the compression wedges 184 and the cantilevered arms 174 point forwardly toward the end of the cable 110. The conductors 12, 14 of cable 110 may be terminated into a pair of contacts 142, 144 of the connector 120 (the contacts are shown in FIGS. 8A-8D, discussed infra). The contacts 142, 144 may be mounted in the contact carrier 140 when the conductors 12, 14 are terminated into the contacts 142, 144, or the contacts 142, 144 may be terminated onto their respective conductors 12, 14 and then installed into the contact carrier 140. In some embodiments, the conductors 12, 14 may remain twisted together essentially all the way up to the point where the conductors 12, 14 terminate into their respective contacts 142, 144. Depending on the contact design, it may or may not be necessary to strip the insulation off of the end portion of each conductor 12, 14 prior to terminating the conductors 12, 14 onto the contacts 142, 144.

Figure 11:
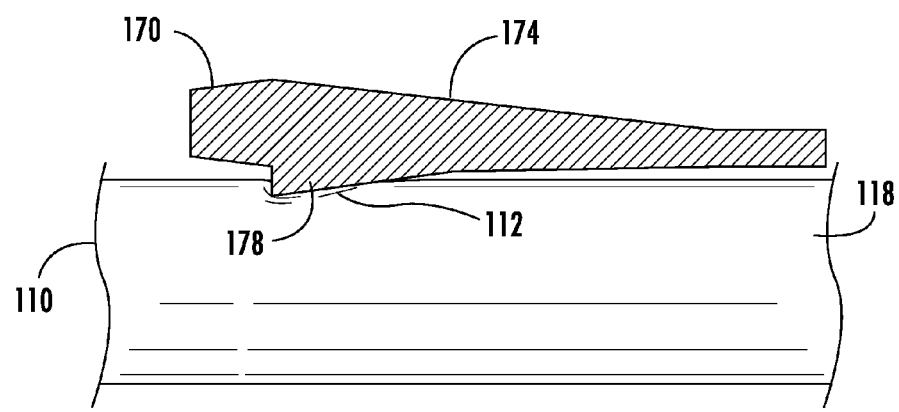
FIG. 11 is a schematic diagram that illustrates how the patch cords according to embodiments of the present invention may have a cable-gripping member that includes teeth or other protrusions that may create depressions within the cable jacket and how the teeth may lock into those depressions to resist rotational forces on the cable of the patch cord.

Next, the contact carrier 140 is inserted into the connector housing 130 via the rear opening into bore 138. At this time, the collar 170 and the cap 180 may still be positioned some distance down the cable 110 from the connector housing 130, as is shown in FIG. 2. As shown in FIGS. 5-6, the rear portion of bore 138 comprises a cable-receiving cavity 139. The rear portion of cable-receiving cavity 139 has sloped walls 135 (e.g., a frusto-conical opening) that reduce the cross-sectional size of the cable-receiving cavity 139 so that the rear opening into the cable-receiving cavity 139 has a greater cross-sectional area than the middle and forward portions of the cable receiving cavity 139. As is readily apparent from FIGS. 5-6, the enlarged rear opening provided by the outward taper of walls 135 allows the collar 170 to be slid into position inside the connector housing 130 such that one or more stop features 173 that protrude from the base 172 of collar 170 (in the depicted embodiment the stop features 173 comprise a pair of rectangular protrusions that extend from the top and bottom of the annular base 172 that can be seen in FIG. 7) engage mating features 175 inside the cable-receiving cavity 139 (in the depicted embodiment the mating features 175 comprise recesses in the top and bottom of the cable-receiving cavity 139), thereby preventing the collar 170 from rotating inside the connector housing 130. The cap 180 can then be slid into position, and the compression wedges 184 and latches 186 of cap 180 may readily slide into the cable receiving cavity 139. However, as the cap 180 is slid farther forwardly, the decreasing cross-sectional area of the cable-receiving cavity 139 forces the cantilevered arms 174, latches 186 and compression wedges 184 radially inwardly. As shown in FIGS. 4-6, the compression wedges 184 overlap the cantilevered arms 174, and thus both the decreasing cross-sectional area of the cable-receiving cavity 139 and the compression wedges 184 act to force the cantilevered arms 174 radially inwardly, which can increase the radial force on the cantilevered arms 174. As a result, the teeth 178 on the interior surfaces of the respective cantilevered arms 174 may be firmly forced against the jacket 18 of cable 110. The jacket 18 may be made of a relatively soft plastic material such as polyvinyl chloride ("PVC"). As shown in FIG. 11, the teeth 178 may create depressions 112 in the jacket 18 and the teeth 178 may lock into place within those depressions 112.

Once the collar 170 and the cap 180 are fully received within the plug-receiving cavity 139, the tabs 188 may reach their respective windows 137 in the housing 130, thereby releasing the radially inward force on the latches 186 which allows the tabs 188 to extend through their respective windows 137. The stops 190 on the tabs 188 lock the latches 186 in place, thereby firmly locking the cap 180 and collar 170 within the plug-receiving cavity 139. While cantilevered latches 186 having tabs 188 with stops 190 and mating windows 137 in the housing 130 are used to lock the strain relief unit 160 in place within the connector housing 130 in the depicted embodiment, it will be appreciated that a wide variety of other means may be used to secure the strain relief unit 160 within the housing 130.

Once in place, the strain relief unit 160 may resist a variety of loads. For example, if a pulling force such as a straight pull (e.g., a force applied in the longitudinal direction away from the connector 120) or a side pull (e.g., a force applied at an angle to the longitudinal direction such as a 45 degree angle in a direction away from the connector 120) is applied to the cable 110, then the radial compression force applied by the collar 170 against the cable jacket 18 will act to reduce or prevent any tendency for this force to pull the cable 110 out of the connector 120 and/or to pull the conductors 12, 14 of cable 110 out of their terminations to their respective contacts 142, 144. Thus, the strain relief unit 160 may provide conventional strain relief properties. Additionally, the position of the cap 180 is fixed with respect to the connector housing 130, and the position of the collar 170 is fixed with respect to the connector housing 130. Moreover, the longitudinally-extending teeth 178 that are lodged within depressions 112 in the cable jacket 18 (see FIG. 11) resist rotation of the cable 110 with respect to the collar 170. Consequently, even if a twisting or rotational force is applied to the cable 110 (in either direction), the cable 110 will resist rotating with respect to the connector 120. Thus, the strain relief unit 160 may help reduce the likelihood that a rotational force applied to the cable 110 may negatively impact the twist of the twisted pair 16 by either loosening or over-tightening the twist. Longitudinally-extending teeth 178 or protrusions may be particularly effective in resisting against rotational forces that are applied to the cable 110.

Figure 8A:
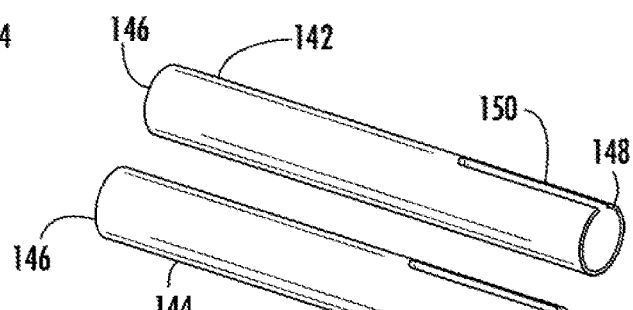
FIG. 8A is a perspective view of the socket contacts of the connector of the patch cord of FIG. 2.
Figure 8B:
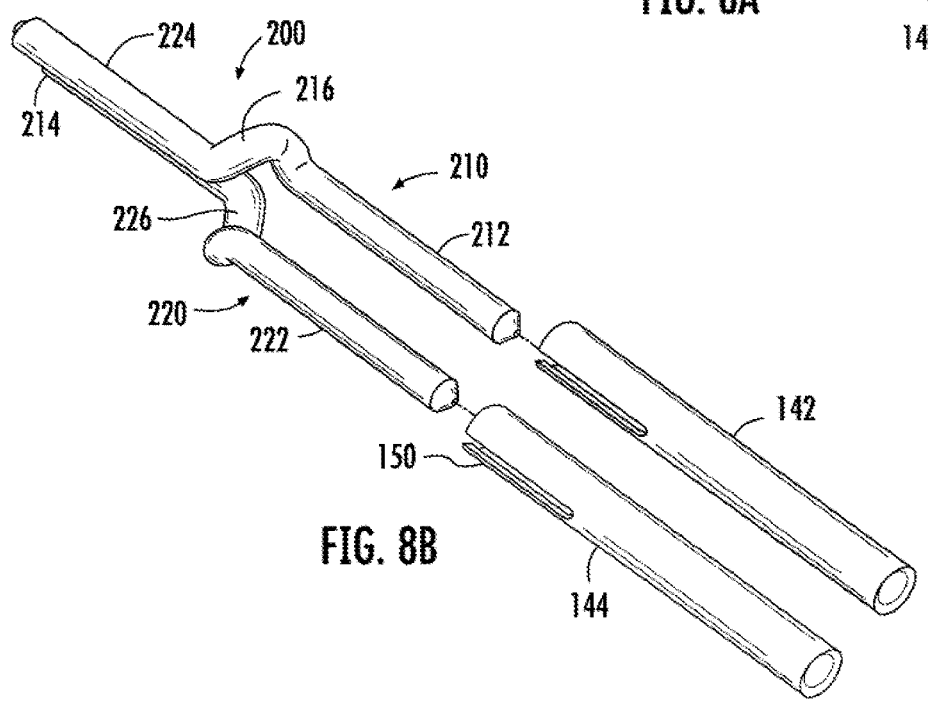
FIG. 8B is a perspective view of the socket contacts of FIG. 8A that illustrates how they mate with the pin contacts of a mating inline connector.
Figure 8C:
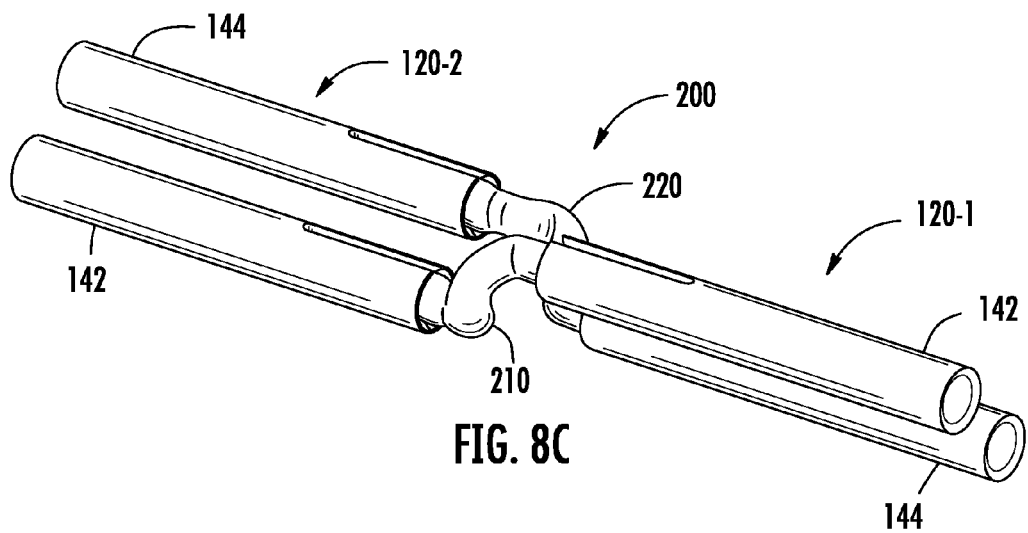
FIGS. 8C and 8D are a perspective view and a top view, respectively, illustrating how the pin contacts of the inline connector of FIG. 8B may be used to electrically connect the socket contacts of two patch cords according to embodiments of the present invention.
Figure 8D:
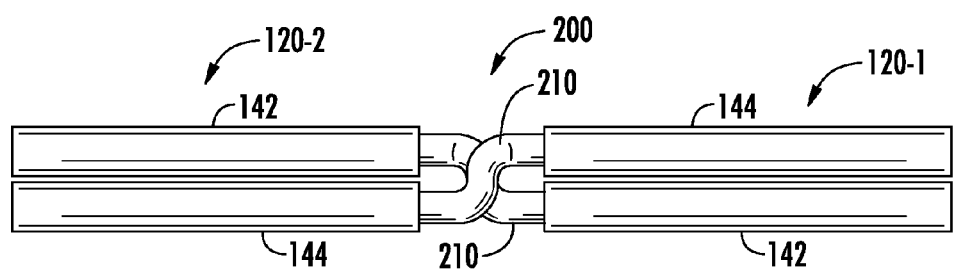

FIGS. 8A and 8B schematically illustrate the contacts 142, 144 of the connector 120. In particular, FIG. 8A is a perspective view of the two contacts 142, 144, while FIG. 8B is a perspective view of the two contacts 142, 144 that illustrates how they mate with the contact structures 210, 220 of a mating inline jack connector 200. FIGS. 8C and 8D are a perspective view and top view, respectively, that show how the contacts 142, 144 of two different connectors 120 may be electrically connected via the contacts of an inline jack connector 200. Note that only the contacts 210, 220 of inline connector 200 (and not the remainder of the connector 200) are shown in order to simplify the drawings.

As shown in FIGS. 8A and 8B, the contacts 142, 144 are implemented as socket contacts and include a tip contact 142 and a ring contact 144. Each contact 142, 144 comprises a hollow cylinder having a rear end 146 and a front end 148. The internal diameter of the rear end 146 of each contact 142, 144 may be sized to receive a respective one of the insulated conductors (with the insulation removed) with an interference fit that provides a good mechanical and electrical connection. In other embodiments, the conductors 12, 14 may be soldered into the rear ends 146 of their respective contacts 142, 144, or the socket contacts 142, 144 may be crimped onto a bare end portion of their respective conductors 12, 14. The front end 148 of each contact 142, 144 may be sized to receive the pin contacts of a mating connector, and may include one or more longitudinal slits 150.

As shown in FIG. 8B, the contacts 210, 220 of the inline jack connector 200 comprise a pair of double-sided crossover tip and ring pin contacts 210, 220. The tip contact 200 includes a first pin 212, a second pin 214 and a crossover segment 216 that connects the first pin 212 to the second pin 224. The ring contact 220 includes a first pin 222, a second pin 224 and crossover segment 226 that connects the first pin 220 to the second pin 224.

As shown in FIGS. 8C and 8D, the tip pin 212 on a first side of the inline connector 200 is received within the tip socket 142 of a first connector 120-1, and the ring pin 214 on the first side of the inline connector 200 is received within the ring socket 144 of the first connector 120-1. Likewise, the tip pin 222 on a second side of the inline connector 200 is received within the tip socket 142 of a second connector 120-2, and the ring pin 224 on the second side of the inline connector 200 is received within the ring socket 144 of the second connector 120-2.

Pin contacts 212 and 214 may each reside in a first horizontally-oriented plane, and pin contacts 222 and 224 may each reside in a second horizontally-oriented plane that is beneath the first horizontally-oriented plane and parallel thereto. Pin contacts 212 and 214 are each tip pin contacts that form a tip conductive path through the inline connector 200. Pin contacts 222 and 224 are each ring pin contacts that form a ring conductive path through the inline connector 200. Thus, the inline connector 200 may be used to electrically connect tip socket contact 142 of a first connector 120-1 to the tip socket contact 142 of a second connector 120-2, and to electrically connect the ring socket contact 144 of connector 120-1 to the ring socket contact 144 of connector 120-2. By staggering the tip and ring pin contacts in two vertical rows and by providing the crossover in the middle of the inline connector 200, the inline connector 200 may exhibit reduced differential and common mode crosstalk between adjacent inline connectors when a plurality of inline connectors are arranged side-by-side in a row.

Figure 9:
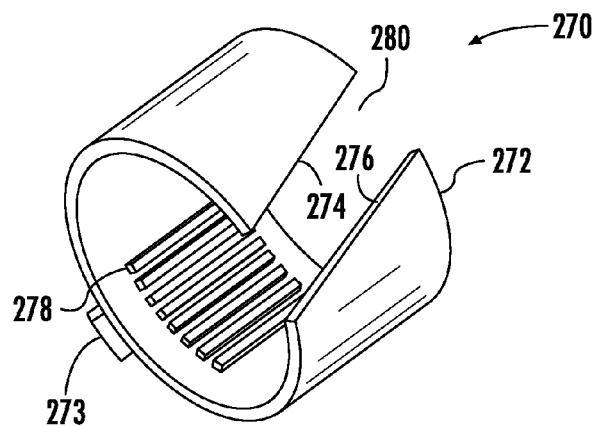
FIG. 9 is a perspective view of a cable-gripping member according to further embodiments of the present invention.

FIG. 9 is a perspective view of a cable-gripping member 270 according to further embodiments of the present invention. The cable-gripping member 270 may be used, for example, in place of the cable-gripping member 170 that is discussed above with reference to FIGS. 2-7. As shown in FIG. 9, the cable-gripping member 270 comprises an annular ring 272 that has a portion of its circumference omitted to form a generally C-shaped ring having an opening 280. The interior surface of the C-shaped ring 272 includes a plurality of protrusions 278. In the depicted embodiment, the protrusions 278 comprise generally longitudinally extending teeth. However, it will be appreciated that any appropriate protrusions may be used that resist twisting forces that are applied to the cable of the patch cord in which cable-gripping member 270 is used. The exterior surface of the ring 272 may include a stop feature 273 that resists rotation of the ring 272 with respect to, for example, the connector housing.

The cable-gripping member 270 of FIG. 9 may be placed on the cable of a patch cord, and may be slid into the housing of the connector of the patch cord once the conductors of the cable are terminated into the contacts of the connector. The cable-gripping member 270 may be compressed tightly onto the cable so that the protrusions 278 make depressions in the cable jacket and resist rotational forces based on both the compression force and the protrusions that are lodged in the depressions in the cable jacket. The cable-gripping member 270 may be compressed onto the cable using a compression member such as the cap 180 of the embodiment of FIGS. 2-7 (modified appropriately to cooperate with the cable-gripping member 270). Alternatively, the cable-gripping member 270 may be compressed by features within the housing that compress the cable-gripping member 270 as the cable-gripping member is inserted into the connector housing. In either case, as the cable-gripping member 270 is compressed, the opposed ends 274, 276 of the C-shaped ring 272 that define the opening 280 of the "C" are pressed together. Thus, the opening in the "C" allows the cable-gripping member 270 to evenly compress around the cable. As shown, in some embodiments, the protrusions 278 may (optionally) only be provided on the interior portions of the C-shaped ring 272 that are opposite the opening 280 to allow the ring to more evenly compress around the cable. The stop feature 273 may mate with a mating feature (not shown) in the interior of the connector housing to resist rotation of the cable-gripping member 270 with respect to the connector housing.

While embodiments of the cable-gripping member that include cantilevered arms and a C-shaped ring are described above, it will be appreciated that other cable-gripping members may be used. Preferably, the cable-gripping member will apply a generally radial compression force on the cable as opposed to only applying a force to, for example, one side of the cable, in order to reduce or minimize the amount that the strain relief unit deforms or changes the relative positions of the conductors within the cable as such changes may negatively impact the electrical performance of the cable.

It will also be appreciated that a wide variety of uneven surfaces or protrusions may be used in the cable-gripping members according to embodiments of the present invention. By way of example, FIGS. 10A-10D are schematic plan views that illustrate additional example protrusion patterns that may be used on the cable-gripping members according to further embodiments of the present invention.

Figure 10A:
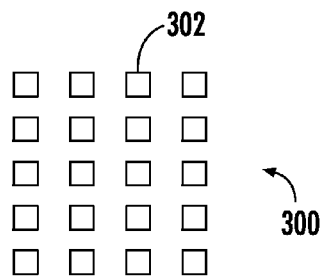
FIGS. 10A-10D are schematic plan views that illustrate protrusion patterns that may be used on the cable-gripping members according to further embodiments of the present invention.
Figure 10B:
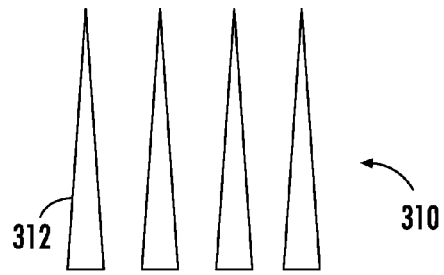
Figure 10C:
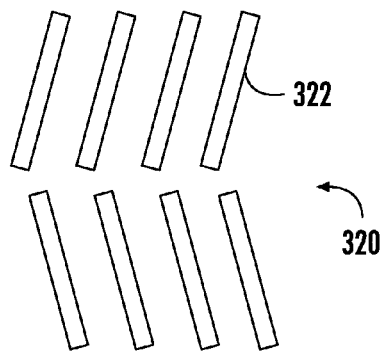
Figure 10D:
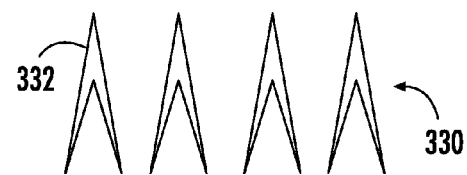

For example, FIG. 10A illustrates a protrusion pattern 300 in which the teeth 178 included on the collar 170 of FIG. 7 are replaced with an array (or other pattern) of small square protrusions 302. It will be appreciated that shapes other than squares may be used in further embodiments. FIG. 10B illustrates a protrusion pattern 310 in which the rectangular teeth 178 included on the collar 170 of FIG. 7 are replaced with triangular teeth 312. FIG. 10C illustrates a protrusion pattern 320 in which the longitudinally-extending teeth included on the collar 170 of FIG. 7 are replaced with teeth 322 that extend at various angles from the longitudinal direction. FIG. 10D illustrates a protrusion pattern 330 in which the rectangular teeth included on the collar 170 of FIG. 7 are replaced with V-shaped protrusions 332. It will also be appreciated that a variety of different types of protrusions may be included on the same cable-gripping member.

In some embodiments, such as the embodiment of FIGS. 2-8, the cable-gripping member 170 may be in a fixed longitudinal position when the cable-gripping member 170 is compressed onto the cable 110. For example, as shown in FIGS. 5-6, a stop 133 is provided within the cable-receiving portion 139 of bore 138. The stop 133 prevents the collar 170 from being moved any farther forwardly into the bore 138, thus fixing the longitudinal position of the collar 170 within the housing 130 when the cap 180 is applied to compress the collar 170 around the cable 110. If the cable gripping member 170 were to move longitudinally during the compression process (as opposed to just squeezing down on the cable 110), the longitudinal movement of the cable gripping member 170 could push the cable 110 further into the connector 120, which could distort the arrangement of the twisted pair 16 and degrade the electrical performance of the patch cord 100. Accordingly, in some embodiments, the connector 120 may include stops such as the stops 133 that fix the longitudinal position of the cable-gripping member 170 during the installation of the strain relief unit 160.

In still further embodiments of the present invention, the cap 180 and collar 170 of the embodiment of FIGS. 2-8 may be modified so that the cap 180 acts as the cable-gripping member and the collar acts as the compression member. In such embodiments, the compression wedges 184 of the embodiment of FIGS. 2-8 may be redesigned to define a circle that has a diameter slightly larger than the diameter of the cable 110, and teeth or other protrusions may be provided on the interior surfaces of the wedges 184. The collar 170 may likewise be designed to fit over the wedges of the cap to compress the wedges of the cap against the cable when the cap is inserted into the rear of the connector housing 130. In some embodiments, the collar could be replaced with interior features in the connector housing that compress the wedges of the redesigned cap against the cable.

In automotive and other vehicle applications, a hardwired cabling connection between two devices such as a processor and a door-mounted camera may need to extend through one or more connection hubs. The patch cords according to embodiments of the present invention may be used to provide connections between these end devices and the connection hubs or between two connection hubs.

It will also be appreciated that aspects of the above embodiments may be combined in any way to provide numerous additional embodiments. These embodiments will not be described individually for the sake of brevity.

While the present invention has been described above primarily with reference to the accompanying drawings, it will be appreciated that the invention is not limited to the illustrated embodiments; rather, these embodiments are intended to fully and completely disclose the invention to those skilled in this art. In the drawings, like numbers refer to like elements throughout. Thicknesses and dimensions of some components may be exaggerated for clarity.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. It will also be understood that the terms "tip" and "ring" are used to refer to the two conductors of a differential pair and otherwise are not limiting.

Spatially relative terms, such as "under", "below", "lower", "over", "upper", "top", "bottom" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

Well-known functions or constructions may not be described in detail for brevity and/or clarity. As used herein the expression "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes" and/or "including" when used in this specification, specify the presence of stated features, operations, elements, and/or components, but do not preclude the presence or addition of one or more other features, operations, elements, components, and/or groups thereof.

Herein, the terms "attached", "connected", "interconnected", "contacting", "mounted" and the like can mean either direct or indirect attachment or contact between elements, unless stated otherwise.

Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

The invention claimed is:

1. A reduced-pair Ethernet patch cord, comprising:
a twisted pair cable that includes a pair of insulated conductors that are contained within a cable jacket;
a connector mounted on a first end of the cable, the connector including:
a connector housing; and
a strain relief unit mounted on the cable at the interface between the cable and the connector housing, the strain relief unit including a collar that surrounds the cable, a stop feature extending radially outward from the collar, and a plurality of compressible arms that extend longitudinally forward form the collar, wherein the stop feature engages a mating feature of the connector housing when the strain relief unit is inserted within the connector housing, the engagement of the stop feature and the mating feature preventing the collar from rotating inside the connector housing.

2. The reduced-pair Ethernet patch cord of claim 1, wherein at least one of the compressible arms includes a plurality of internal protrusions that contact the cable jacket and wherein the internal protrusions are generally longitudinally aligned with a longitudinal axis of the connector.

3. The reduced-pair Ethernet patch cord of claim 1, wherein the strain relief unit comprises a cable-gripping member, which includes the collar, the plurality of arms and the stop feature, that engages the cable and a compression member that is configured to apply a radially compressive force on the cable-gripping member, wherein the compression member is fixed relative to the connector housing.

4. The reduced-pair Ethernet patch cord of claim 2, wherein the protrusions comprise teeth that are provided on an interior surface of the cable-gripping member.

5. The reduced-pair Ethernet patch cord of claim 2, wherein the protrusions are configured to create respective depressions in the cable jacket.

6. The reduced-pair Ethernet patch cord of claim 1, wherein the twisted pair cable includes only a single pair of insulated conductors.

7. The reduced-pair Ethernet patch cord of claim 2, wherein the internal protrusions contact the cable jacket to resist against rotational forces applied to the cable.

8. A patch cord, comprising:
a cable that includes a cable jacket that has at least one twisted pair of insulated conductors disposed therein;
a connector that has a housing mounted on a first end of the cable, the connector including a strain relief unit positioned at least partly within the housing, the strain relief unit including:
a cable-gripping member that is mounted on the cable, the cable-gripping member including a collar that surrounds the cable, a stop feature extending radially outward from the collar, and a plurality of cantilevered arms that extend forward from the collar, wherein the stop feature engages a mating feature of the housing of the connector when the cable-gripping member is inserted within the housing, the engagement of the stop feature and the mating feature preventing cable-gripping member from rotating inside the housing;
a compression member that is configured to apply a compressive force against the cable-gripping member when the compression member and cable-gripping member are installed within the connector.

9. The patch cord of claim 8, wherein the compression member is configured to apply a radial force to the cable-gripping member.

10. The patch cord of claim 8, wherein at least one of the plurality of cantilevered arms includes an uneven surface that is positioned to contact the cable jacket and wherein the uneven surface is configured to create a plurality of depressions in the cable jacket.

11. The patch cord of claim 8, wherein the compression member comprises a cap that is mounted on a rear end of the housing.

12. The patch cord of claim 8, wherein an interior surface of each of the cantilevered arms comprises an arcuate surface.

13. The patch cord of claim 10, wherein the uneven surface comprises a plurality of teeth.

14. The patch cord of claim 8, wherein the compression member includes a plurality of wedge shaped arms that are configured to apply a radially compressive force on respective ones of the cantilevered arms when the compression member and the cable-gripping member are installed within the housing.

15. The strain relief unit of claim 8, wherein the patch cord includes at least one and no more than three twisted pairs of conductors.

16. A method of connectorizing a cable, the method comprising:
terminating a first conductor of a twisted pair of conductors of a communications cable into a first contact;
terminating a second conductor of a twisted pair of conductors of a communications cable into a second contact;
inserting end portions of the terminated first and second conductors and the first and second contacts into a connector housing;
sliding a strain relief unit along the communications cable and into a rear opening of the connector housing; and
compressing a cable-gripping member of the strain relief unit onto the communications cable,
wherein the cable-gripping member has at least one stop feature that is positioned to engage a mating feature of the connector housing when the strain relief unit is installed in the connector housing, wherein engagement of the stop feature and the mating feature prevents rotation of the strain relief unit within the connector housing.

17. The method of claim 16, wherein the cable-gripping member is at a fixed longitudinal position within the connector when it compresses onto the communications cable.

18. The method of claim 16, wherein compressing the cable-gripping member of the strain relief unit onto the communications cable comprises sliding a compression member of the strain relief unit onto the cable-gripping member.

* * * * *

UNITED STATES PATENT AND TRADEMARK OFFICE
CERTIFICATE OF CORRECTION

PATENT NO. : 10,270,204 B2
APPLICATION NO. : 15/786822
DATED : April 23, 2019
INVENTOR(S) : Scott M. Keith et al.

It is certified that error appears in the above-identified patent and that said Letters Patent is hereby corrected as shown below:

In the Claims

Column 14, Line 51, Claim 1: "forward form the collar," should read --forward from the collar,--

Signed and Sealed this
Twenty-second Day of June, 2021

Drew Hirshfeld
*Performing the Functions and Duties of the
Under Secretary of Commerce for Intellectual Property and
Director of the United States Patent and Trademark Office*